United States Patent [19]

Tsuchida

[11] Patent Number: 5,646,989
[45] Date of Patent: Jul. 8, 1997

[54] TELEPHONE APPARATUS

[75] Inventor: Shinji Tsuchida, Zama, Japan

[73] Assignee: Canon Kabushiki Kaisha, Japan

[21] Appl. No.: 358,388

[22] Filed: Dec. 19, 1994

Related U.S. Application Data

[62] Division of Ser. No. 669,579, Mar. 14, 1991, Pat. No. 5,420,918.

[30] Foreign Application Priority Data

| Mar. 20, 1990 | [JP] | Japan | 2-68223 |
| Mar. 20, 1990 | [JP] | Japan | 2-68224 |
| May 10, 1990 | [JP] | Japan | 2-118703 |

[51] Int. Cl.$^6$ .................................................. H04M 1/27
[52] U.S. Cl. ................................. 379/352; 379/372
[58] Field of Search ............................ 379/375, 352, 379/92, 399, 372, 215, 373, 355; 370/110.1, 58.1, 60, 60.1

[56] References Cited

U.S. PATENT DOCUMENTS

| 5,001,709 | 3/1991 | Satoh | 379/375 |
| 5,008,884 | 4/1991 | Yazawa et al. | 379/375 |

FOREIGN PATENT DOCUMENTS

| 60-10992 | 1/1985 | Japan . |
| 61-228799 | 10/1986 | Japan . |
| 63-64495 | 3/1988 | Japan . |

*Primary Examiner*—Krista M. Zele
*Assistant Examiner*—Jacques M. Saint-Surin
*Attorney, Agent, or Firm*—Fitzpatrick, Cella, Harper & Scinto

[57] ABSTRACT

Provided is an exchange system accommodating an ISDN circuit as a line wire, in which a channel of the line wire is capable of being selected by an operation performed at a connected telephone. If, in a state where the ISDN circuit has been selected by the connected telephone, a terminating request which has designated the channel in the selected state is received and this terminating request is answered, the selected state on the side of the connected telephone is cancelled. As a result, the operator on the transmitting side can be informed of the fact that the transmitting operation has been interrupted. Further, by denying the received terminating request which has designated the channel in the selected state, a situation in which a transmission from the selected channel can no longer be made is eliminated. Moreover, by performing control in such a manner that the terminating request is answered using another channel when the terminating request which has designated the channel of the ISDN circuit in the selected state is received, a situation in which a transmission from the selected line wire can no longer be made is eliminated. Performing such control improves the operability of the exchange system.

16 Claims, 10 Drawing Sheets

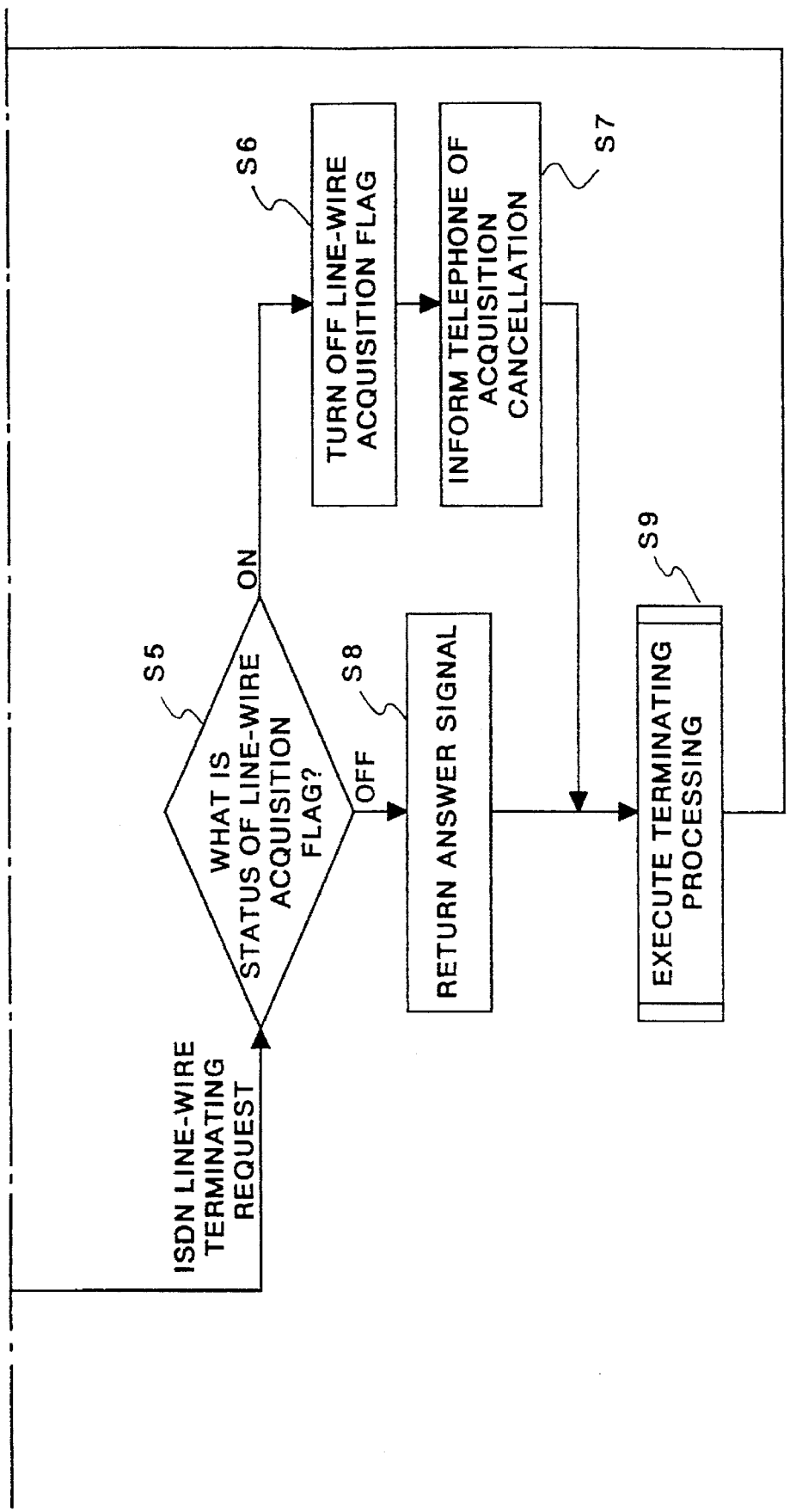
F I G. 3B

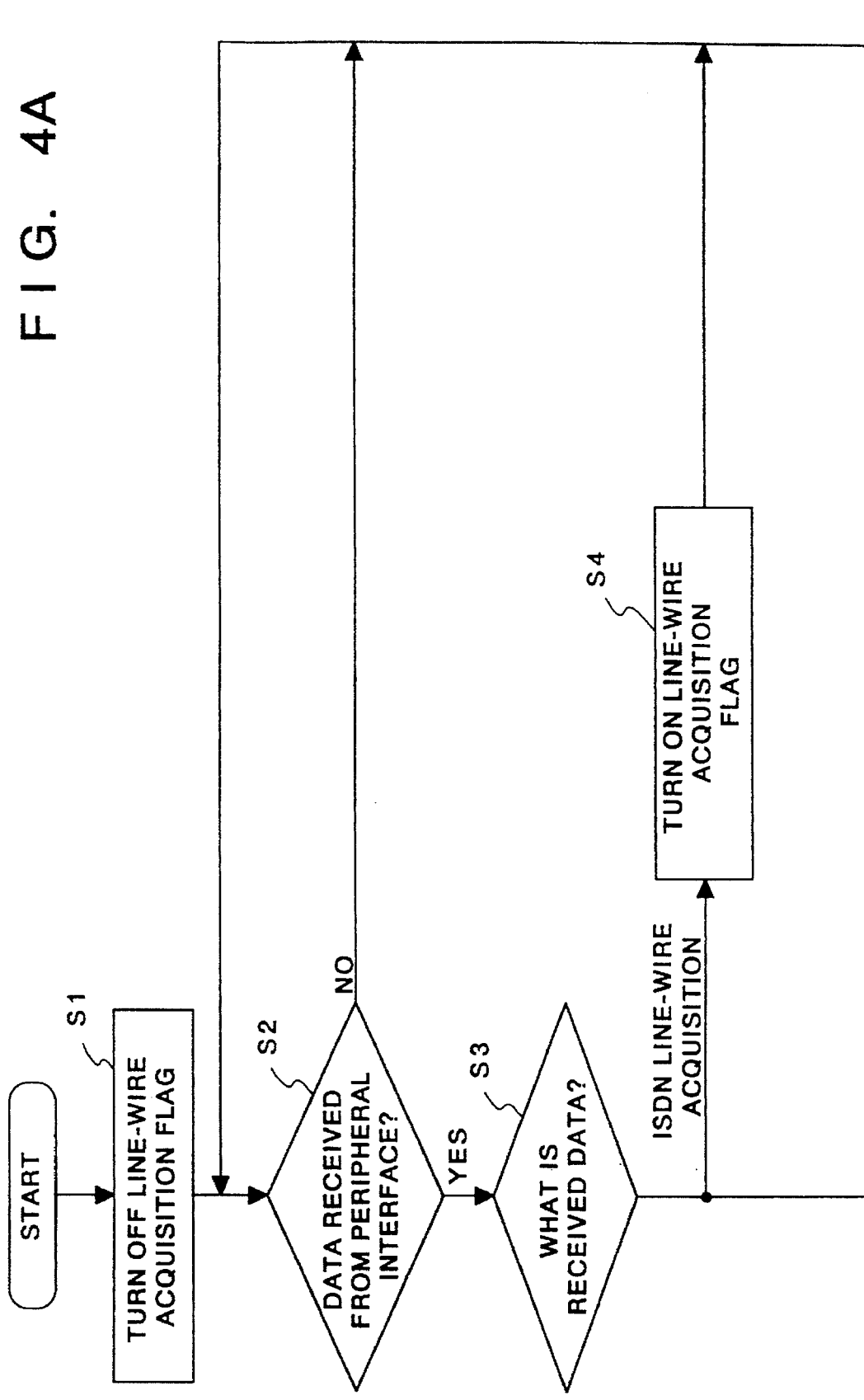

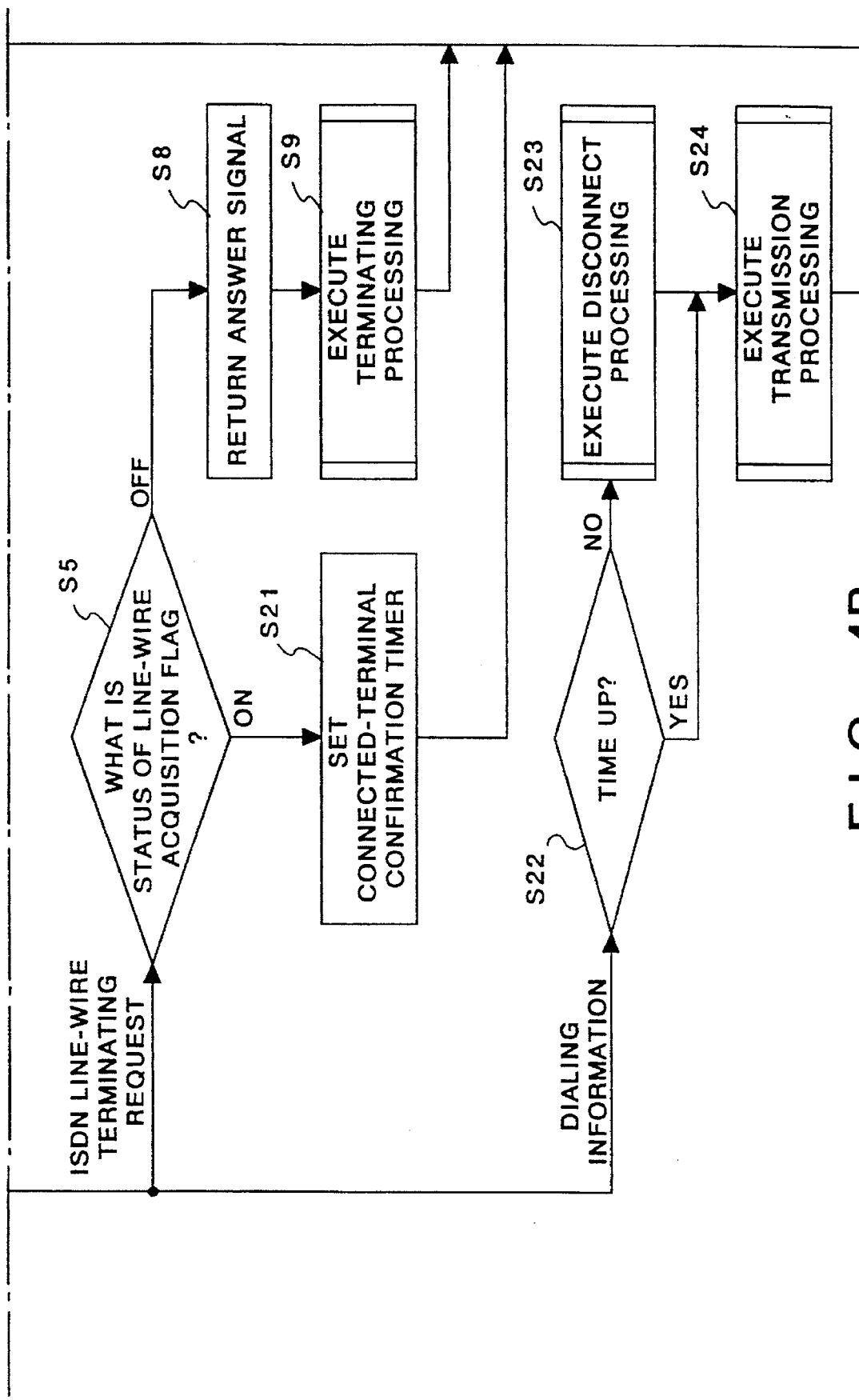
F I G. 4B

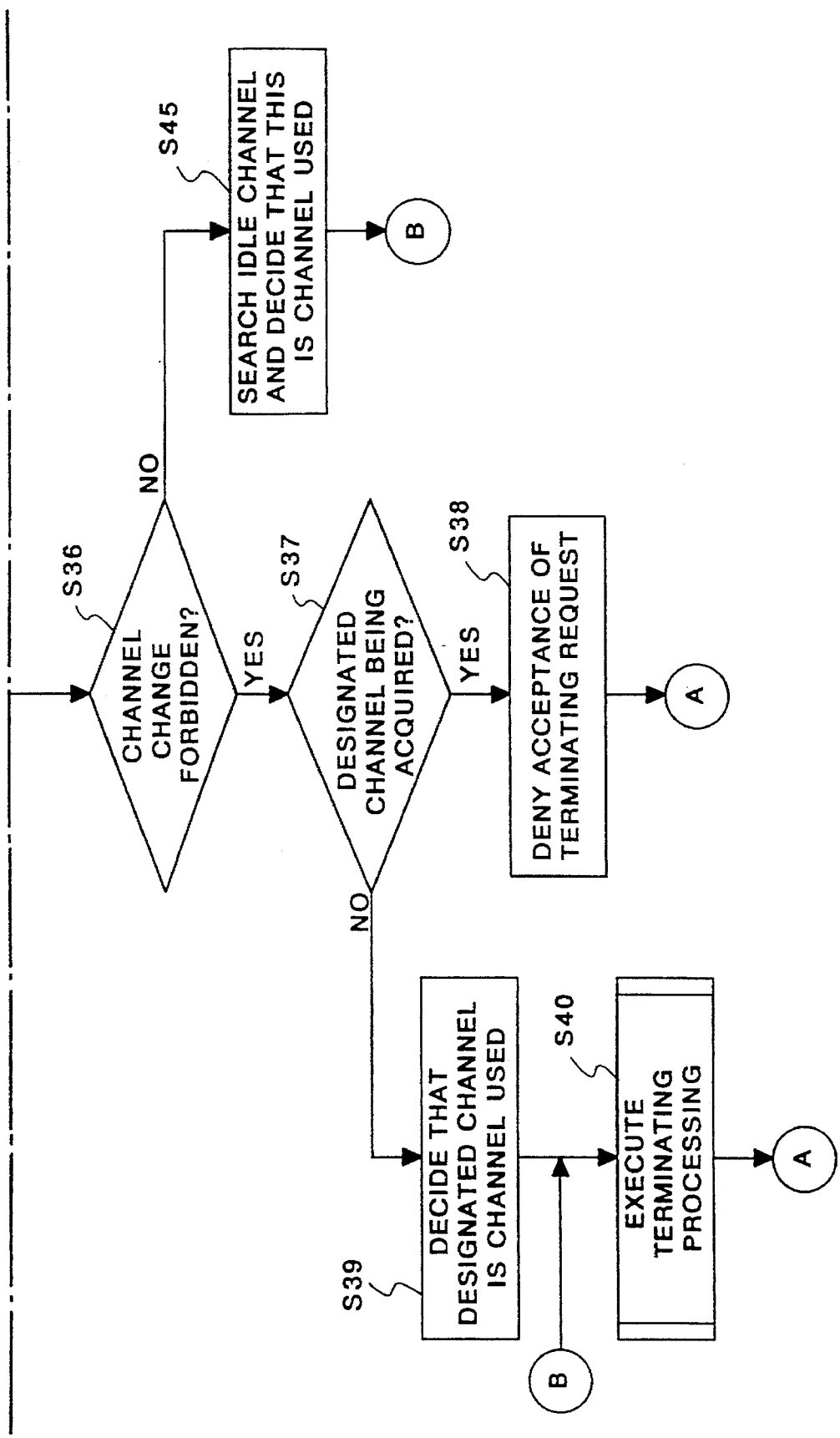
F I G. 5B

TELEPHONE APPARATUS

This application is a division of application Ser. No. 07/669,579 filed Mar. 14, 1991, now U.S. Pat. No. 5,420,918.

BACKGROUND OF THE INVENTION

This invention relates to an telephone apparatus in which an external channel is capable of being selected and acquired.

When a terminating request signal is received in a conventional exchange system in which an ISDN circuit is accommodated as a line wire, even though the circuit which has received the terminating request signal may be in a state reserved for acquisition, processing is executed in exactly the same way as when the circuit is not in the acquired state.

By way of example, in a case where an ISDN circuit is acquired and a transmitting operation is performed in an exchange system accommodating the ISDN as a line wire, first the user reserves one of the information channels B1, B2 of the ISDN circuit and then enters dialing information. When the entry of all dialing information ends, the main apparatus sends a transmit-request signal, which has designated a reserved information channel, and executes transmission processing.

In a case where a terminating request signal has been received from the ISDN circuit, a response is made depending upon the actual state of use of the B channel designated by the terminating request signal received.

However, if, in the example of the prior art described above, a terminating request signal which has designated the B1 channel is detected from the ISDN circuit while the user is in the course of entering dialing information from an extension telephone upon having reserved the B1 channel of the ISDN circuit, the B1 channel will not yet be in a reserved state. Consequently, a response will be made to the terminating request without any notification whatsoever being given to the user. As a result, the user, who has reserved the B1 channel and performed the transmitting operation, is likely to become confused because a transmission cannot actually be made despite the fact that the proper operation has been carried out.

In other words, even though the user believes that he has acquired the circuit, a response is made to the terminating request signal. Therefore, even if the person who has reserved acquisition of the circuit subsequently performs a transmission operation, another individual will be using the reserved circuit and it will be impossible to make the transmission. This can cause the user to become confused.

For example, if, when the acquired line wire is the B1 channel from among the three channels (the two B channels and the D channel) of the ISDN circuit, a terminating request signal which has designated the B1 channel is received and a response is made to this signal, a transmission can no longer be made over the acquired line wire at the terminal connected to the extension. This can cause great confusion in terms of operation.

SUMMARY OF THE INVENTION

An object of the present invention is to provide an telephone apparatus which improves upon operability by solving the aforementioned problem.

Specifically, an object of the present invention is to prevent a call operation from being interfered with by an incoming call.

Further, an object of the present invention is to provide an exchange system accommodating an ISDN circuit as a line wire, in which the line wire is capable of being selected by an operation performed at a connected telephone, wherein when the connected telephone is in a state where it has selected the ISDN circuit, the selected state on the side of the connected telephone is cancelled if a terminating request from the ISDN in the selected state is received and a response is made to this terminating request, the end result being improved operability.

Another object of the present invention is to provide an exchange system in which, when an ISDN circuit has been selected on the side of a connected telephone and a terminating request is then received from this ISDN circuit in the selected state, the terminating request is denied, thereby eliminating a situation in which a transmission can no longer be made from the selected line wire, the end result being improved operability.

A further object of the present invention is to provide an exchange system in which, when a channel of an ISDN circuit has been selected on the side of a connected telephone and a terminating request is then received from this channel of the ISDN circuit in the selected state, control is performed in such a manner that a response is made to the terminating request using another channel, thereby eliminating a situation in which a transmission can no longer be made from the selected line wire, the end result being improved operability.

According to the present invention, the foregoing objects are attained by providing an exchange system accommodating an ISDN circuit as a line wire, in which the line wire is capable of being selected by a line-wire key or a special-number operation, comprising discriminating means for discriminating whether the ISDN circuit is in a selected state or not, and cancelling means for cancelling the selected state if the result of discrimination performed by the discriminating means indicates the selected state and a terminating request signal has been received from the ISDN circuit.

In the above arrangement, it is discriminated whether the ISDN circuit is in the selected state. If the result of discrimination indicates the selected state and a terminating request signal has been received from the ISDN circuit, then operation is such that the selection is cancelled. As a result, the user can determine the state of the selected line wire and is capable of taking the proper action.

In another aspect of the invention, the foregoing objects are attained by providing an exchange system accommodating an ISDN circuit as a line wire, in which the line wire is capable of being selected by a line-wire key or a special-number operation, comprising discriminating means for discriminating whether the ISDN circuit is in a selected state or not, and denying means for denying a terminating request if the result of discrimination performed by the discriminating means indicates the selected state and the terminating request has been received from the ISDN circuit.

In the above arrangement, it is discriminated whether the ISDN circuit is in the selected state. If the result of discrimination indicates the selected state and a terminating request has been received from the ISDN circuit, then operation is such that the terminating request is denied. As a result, even if the terminating request signal is received from the line wire when the ISDN circuit is in the selected state, a situation in which a transmission can no longer be made from the selected line wire is eliminated. This has the effect of making operation easier.

In another aspect of the invention, the foregoing objects are attained by providing an exchange system accommodating an ISDN circuit as a line wire, wherein the ISDN circuit is capable of being selected by an operation performed at a terminal connected to an accommodated extension, comprising discriminating means for discriminating whether the terminal connected to the extension has selected a channel of the ISDN circuit, and terminating request distributing means for accepting a terminating request from the ISDN circuit via another idle channel if, when a terminating request signal from the ISDN circuit is received while the discriminating means has discriminated channel selection of the ISDN circuit, a channel desired for use by the received terminating request signal is being selected.

The terminating request distributing means does not accept the terminating request signal in a case where this signal is a designation to the effect that a channel cannot be changed, even if the channel desired for use by the received terminating request signal is being selected when the terminating request signal from the ISDN circuit is received.

In yet another aspect of the invention, the foregoing objects are attained by providing an exchange system accommodating an ISDN circuit as a line wire, wherein the ISDN circuit is capable of being selected by an operation performed at a terminal connected to an accommodated extension, comprising discriminating means for discriminating whether the terminal connected to the extension has selected a channel of the ISDN circuit, and changing means for investigating another idle channel and changing the selected channel of the terminal connected to the accommodated extension to another idle channel if, when a terminating request signal from the ISDN circuit is received while the discriminating means has discriminated channel selection of the ISDN circuit, a channel desired for use by the received terminating request signal is being selected.

In the above arrangement, even if the terminating request signal is received from the line wire when the ISDN circuit is in the selected state, a situation in which a transmission can no longer be made from the selected line wire is eliminated. This has the effect of making operation easier.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

FIGS. 3A and 3B are flowcharts showing a control procedure according to the first embodiment;

FIGS. 4A and 4B are flowcharts showing a control procedure according to the second embodiment of the invention;

FIGS. 5A and 5B are flowcharts showing a control procedure according to the third embodiment of the invention.

DESCRIPTION OF THE PREFERRED EMBODIMENTS

Embodiments of the present invention will now be described in detail with reference to the drawings.

First Embodiment

Figure 1:
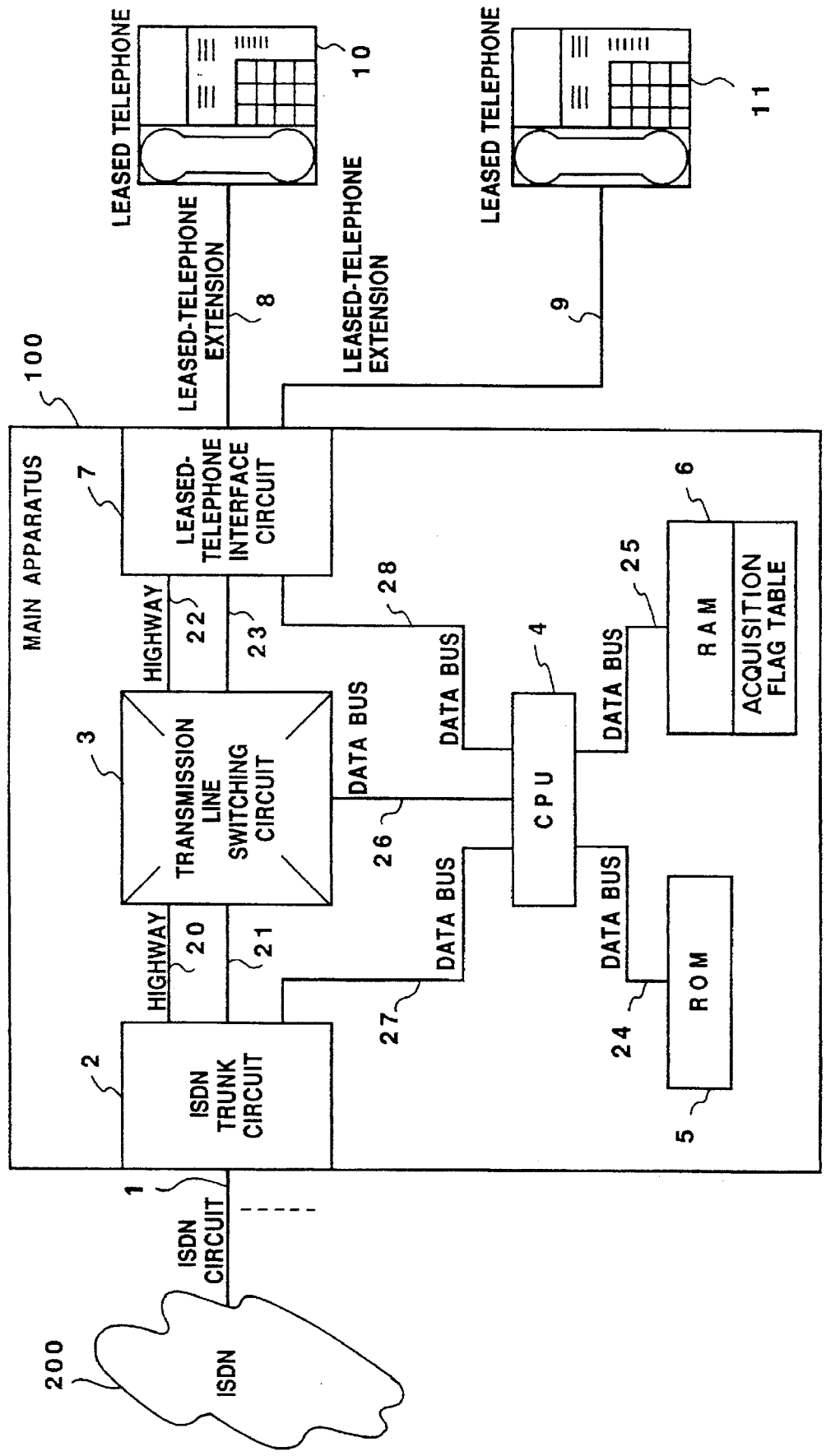
FIG. 1 is a system block diagram illustrating a first embodiment of the present invention.
Figure 2:
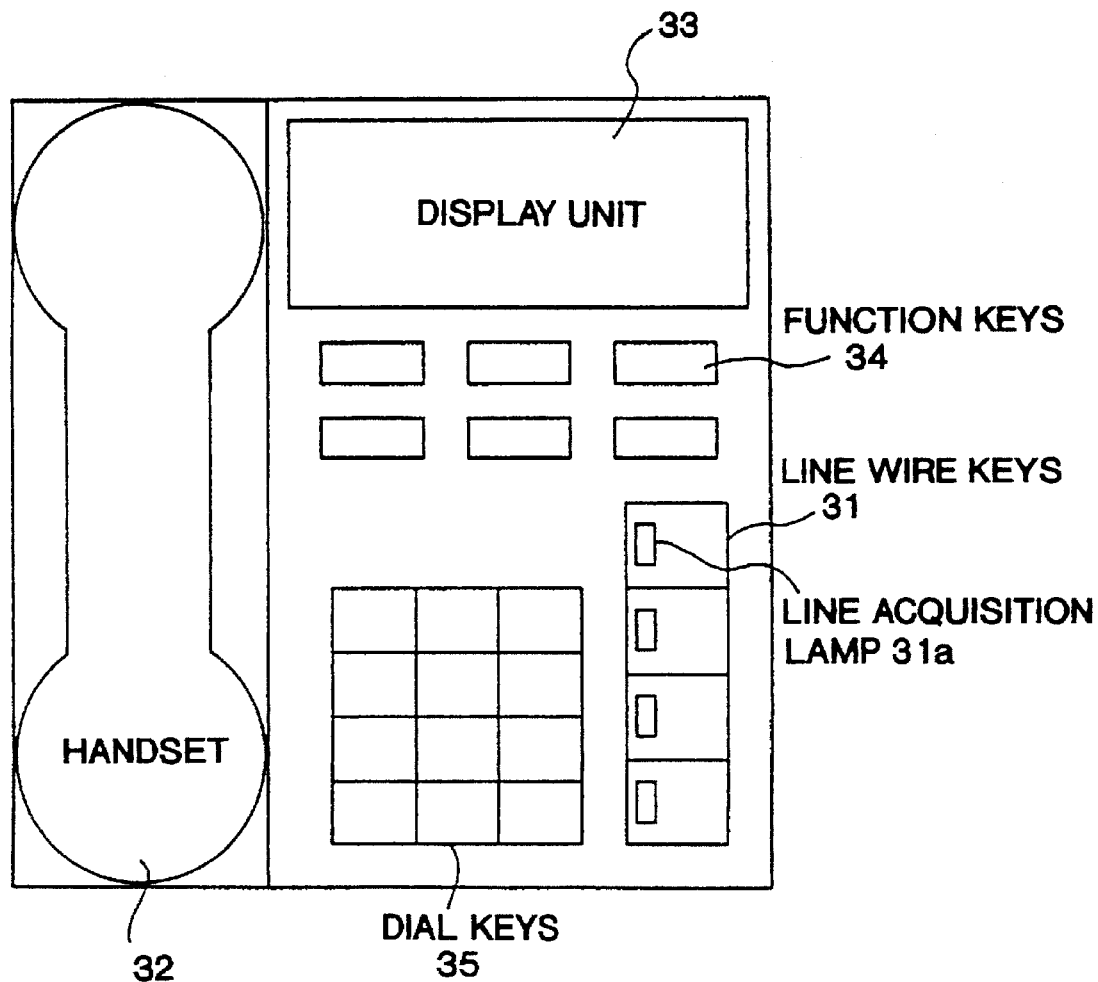
FIG. 2 is an external view of a leased telephone according to the first embodiment shown in FIG. 1.

Description of Construction (FIGS. 1 and 2)

FIG. 1 is a block diagram illustrating the construction of an exchange system according to this embodiment.

As shown in FIG. 1, an ISDN circuit 1 is accommodated as a line wire. The channels of this circuit are assumed to be basic interfaces (2B+D) in this embodiment. Leased-telephone extensions (connecting cables) 8, 9 connect a leased-telephone interface circuit 7 with leased telephones 10, 11. The leased telephones 10, 11 are accommodated as extension telephones in the exchange system of this embodiment. Reference numeral 100 denotes the main apparatus of the exchange system, and numeral 200 the ISDN.

The main apparatus 100 includes an ISDN trunk circuit 2, a transmission-line switching circuit 3, a CPU 4, a ROM 5, a RAM 6 and the interface circuit 7. The ISDN trunk circuit 2 accommodates the ISDN circuit 1. The ISDN trunk circuit 2 is capable of accommodating a plurality of ISDN circuits. The transmission-line switching circuit 3 is for switchingly connecting various highways in response to instructions from the CPU 4. The CPU (central processing unit) 4 administers overall control of the exchange system of this embodiment in accordance with a control procedure shown, by way of example, in FIGS. 3A and 3B. The control procedure, which will be described below, is stored in the ROM 5 in the form of a program to control the CPU 4. The RAM 6 is for temporarily storing data processed by the CPU 4, the data including an acquisition flag table for every channel of the accommodated ISDN circuit. The RAM 6 is a memory comprising a work area used when the CPU 4 executes processing, as well as various control tables. If a channel has its acquisition flag set in the acquisition flag table of RAM 6, this indicates that the channel is presently undergoing acquisition or that acquisition thereof is being reserved. The leased-telephone interface circuit 7 accommodates the leased telephones 10, 11 in the exchange system. (Though two leased telephones are accommodated in this embodiment, it is possible for three or more leased telephones to be accommodated.)

Highways 20, 21 connect the ISDN trunk circuit 2 and the transmission-line switching circuit 3, and highways 22, 23 connect the leased-telephone interface circuit 7 and the transmission-line switching circuit 3. Data buses 24 through 28 emerge from the CPU 4.

FIG. 2 is a view showing the external appearance of the leased telephones 10, 11 illustrated in FIG. 1.

As shown in FIG. 2, the telephone includes line-wire keys 31 for designating line wires, each key having a line-wire acquisition lamp 31a which indicates whether the corresponding line wire has been acquired or not or whether acquisition thereof has been reserved or not. The telephone further includes a handset 32 for conversation, a display unit 33 which displays such information as time and telephone numbers, function keys 34 for implementing such functions as one-touch dialing and holding, and dial keys 35.

In the arrangement described above, the 2B+D information of the ISDN circuit 1 is handled by the operation of the ISDN trunk circuit 2 in a manner described below.

The two B channels are divided into separate B channels and connected to the highways 20, 21, respectively, whence they are connected to the input side of the transmission-line switching circuit 3. These highways are connected to the highways 22, 23 by the transmission-line switching circuit 3. Thus, a channel is established between the leased telephones 10, 11 and the ISDN circuit 1.

The information on the D channel of the ISDN circuit 1 is divided into B channels by the ISDN trunk circuit 2, and the information is sent to the CPU 4 via the data bus 27. On the basis of the D-channel information, the CPU 4 controls the transmission-line switching circuit 3 and controls the leased telephones by performing an exchange of data, which controls these telephones, with the leased-telephone interface circuit 7 via the data bus 28.

Figure 3A:
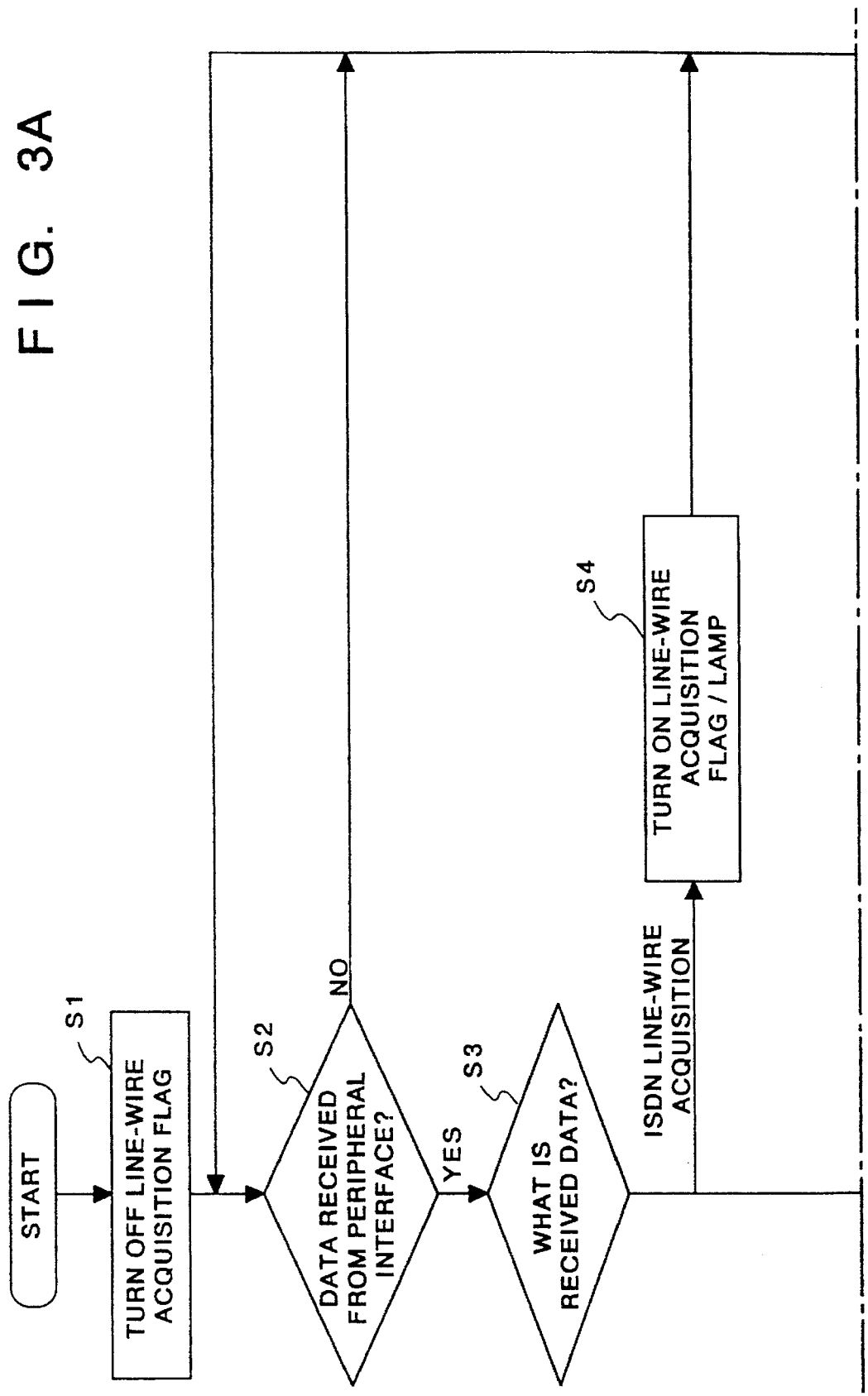

Description of Control Procedure (FIGS. 3A, 3B)

The control procedure according to this embodiment will now be described in accordance with the flowchart shown in FIGS. 3A and 3B.

First, at step S1, the CPU 4 initially sets (resets) the line-wire acquisition flags of the ISDN circuit. These flags are in the acquisition flag table stored in RAM 6. Monitoring is performed at step S2 to determine whether control data has been sent from the peripheral interface circuitry (the ISDN trunk circuit 2 or leased-telephone interface circuit 7) via the data buses 27, 28.

It should be noted that the line-wire acquisition flags in this embodiment have been defined in a flag area within RAM 6, as shown in FIG. 1, and that the flags are provided in correspondence with the ISDN circuit 1.

If, under these conditions, one line-wire key 31 on the leased telephone 10 or 11 connected to the leased-telephone extensions (e.g., the line-wire key 31 on leased telephone 10) is pressed, information informing of the fact that the line-wire key 31 has been pressed is sent to the leased-telephone interface circuit 7 via the leased-telephone extension 8. Upon receiving this information, the leased-telephone interface circuit 7 informs the CPU 4, via the data bus 28, of the fact that the line-wire key 31 of telephone 10 has been pressed. Upon being so notified, the control executed by the CPU 4 shifts from step S2 to step S3. The program then proceeds to the ensuing steps based upon the contents of the received data.

If the information indicating that the line-wire key 31 has been pressed is line-wire acquisition information, the program proceeds from step S3 to step S4, at which the CPU 4 sets the acquisition flag of the corresponding circuit in the acquisition flag table of RAM 6. This flag indicates that acquisition of the line wire has been reserved. Further, the CPU 4 instructs the leased telephone 10, via the data bus 28, leased-telephone interface circuit 7 and leased-telephone extension 8, to light the line-wire acquisition lamp 31a. The lighting of the line-wire acquisition lamp 31a of leased telephone 10 notifies the user of the fact that the line wire has been acquired. The program then returns to step S2, where the system waits for dialing information from the leased telephone 10. The CPU 4 sends a terminating request signal from the D channel after all dialing information is received.

When it is determined at step S3 that the ISDN trunk circuit 2 has received a terminating request signal from the ISDN circuit 1, the CPU 4 is so notified via the data bus 27. In response to such notification, the CPU 4 causes the program to proceed from step S3 to step S5, at which it is determined whether the line-wire acquisition flag in RAM 6 has been set (turned ON) or reset (turned OFF). If, as a result of this determination, the circuit for which termination is being requested has not been acquired and the line-wire flag is OFF, the program proceeds to step S8. Here the ISDN trunk circuit 2 is instructed, via the data bus 27, to return an answer signal (a call proc. or alert signal) in response to the terminating request signal. In addition, the line-wire acquisition flag is set. Thereafter, ordinary terminating processing is executed at step S9. This terminating processing is well-known art and need not be described in detail here.

If, on the other hand, it is found at step S5 that the line-wire acquisition flag is ON, then the program proceeds to step S6, where the reservation for line-wire acquisition is cancelled and the line-wire acquisition flag is turned OFF. Then, at step S7, the leased telephone 10 is notified, via the data bus 28, leased-telephone interface circuit 7 and leased-telephone extension 8, of the fact that reservation of line-wire acquisition has been cancelled, and the leased telephone 10 is instructed to extinguish the line-wire acquisition lamp 31a. The program then proceeds to the aforementioned step S9, where the usual terminating processing is executed. In other words, in case of general calling, the line-wire lamps of all leased telephones are made to flash. In case of selective calling, the line-wire lamp on the selected leased telephone is made to flash.

In accordance with this embodiment, as described above, when acquisition of an ISDN line wire is reserved and then a terminating request signal is received from the line wire whose acquisition is being reserved, the user can be informed of the fact that reservation for line-wire acquisition has been cancelled. This has the effect of facilitating operation.

In the embodiment described above, a line-wire acquisition flag is furnished for every ISDN circuit. However, two line-wire acquisition flags can be provided if the circuit is a basic circuit (2B+D), and 23 flags can be provided if the circuit is a primary circuit (23B+D), with control being carried out for every B channel.

In accordance with this embodiment, as described above, if an ISDN circuit receives a terminating request from an ISDN while acquisition of this ISDN circuit is being reserved, the user can be informed of the fact that a transmission operation has been interrupted. Accordingly, the exchange system of the invention has improved operability.

Second Embodiment

According to the description given above, if a terminating request signal is received from a line wire, whose acquisition has been reserved, while acquisition of the ISDN line wire is being reserved, the reservation for acquisition is cancelled and the user is informed of the fact that the transmission operation has been interrupted. However, the present invention is not limited to the foregoing embodiment. Specifically, an arrangement can be adopted in which, when a terminating request is received from an ISDN circuit, control is performed so as to deny the request, thus providing the same advantages in terms of operability.

A second embodiment of the invention, in which control is performed to deny a terminating request if such a request is received from an ISDN circuit, will now be described in detail in accordance with the flowchart shown in FIGS. 4A and 4B. It should be noted that processing steps identical with those of the first embodiment are designated by like step numbers.

In the second embodiment, the construction of the exchange system is the same as that shown in FIG. 1, and the external appearance of the leased telephone is the same as that depicted in FIG. 2.

First, at step S1, the CPU 4 initially sets (turns OFF) the flag (the line-wire acquisition flag) indicating whether the ISDN circuit 1 has been acquired or not. Next, at step S2, the system waits for the arrival of data from the ISDN trunk circuit 2 or leased-telephone interface circuit 7, each of which serves as a peripheral interface. In response to receipt of the data, the CPU 4 causes the program to advance to step S3. The program then proceeds to the ensuing steps based upon the contents of the received data.

It should be noted that the line-wire acquisition flags in this embodiment have been defined in the flag area within RAM 6, and that the flags are provided in correspondence with the ISDN circuit 1.

If the user now presses one line-wire key 31 on leased telephone 10, information informing that the line-wire key 31 has been pressed is sent from the leased telephone 10 to the leased-telephone interface circuit 7 via the leased-telephone extension 8. Upon receiving this information, the leased-telephone interface circuit 7 informs the CPU 4, via the data bus 28, of the fact that the line-wire key 31 of telephone 10 has been pressed. Upon being so notified, the control executed by the CPU 4 shifts from step S3 to step S4, where the line-wire acquisition flag, which indicates that acquisition of the line wire has been reserved, is set (turned ON). The program then returns to step S2, where the system waits for dialing information to be sent from the leased telephone 10.

When it is determined at step S3 that the ISDN trunk circuit 2 has received a terminating request signal from the ISDN circuit 1, the CPU 4 is so notified via the data bus 27. In response to such notification, the CPU 4 causes the program to proceed from step S3 to step S5, at which it is determined whether the line-wire acquisition flag is ON or OFF. If, as a result of this determination, the line-wire acquisition flag is OFF, then the program proceeds to step S8. Here the ISDN trunk circuit 2 is instructed, via the data bus 27, to return an answer signal (a call proc. or alert signal) in response to the terminating request signal, and the line-wire acquisition flag is set. Thereafter, ordinary terminating processing is executed at step S9.

If the line-wire acquisition flag is found to be ON at step S5, then the program proceeds to step S21, where a connected-terminal confirmation timer is set before the program returns to step S2. This timer clocks the time needed for the judgment, on the calling side, to disconnect a placed call when there is no response on the called side. Once set, the timer begins monitoring time. The system waits for transmission of dialing information from the leased telephone 10 without returning an answer signal in response to the terminating request signal.

When all of the necessary dialing information has entered following expiration of the time in the above-mentioned timer, the inputted dialing information is transmitted from the leased telephone 10 via the leased-telephone extension 8, the leased-telephone interface circuit 7 and the data bus 28, and the program proceeds from steps S3, S22 to step S24, at which the usual transmission processing is executed. In other words, all of the entered dialing information is sent to the ISDN trunk circuit 2 via the data bus 27. The ISDN trunk circuit 2 constructs a call request signal (a set-up signal) from the sent dialing information, after which a call request signal is sent to the D channel of the ISDN circuit 1. The reason for this is that if the aforementioned connected-terminal confirmation timer has run out of time, this means that the calling side has disconnected a placed call owing to the absence of an answer from the called side.

If dialing information is entered before expiration of time in the connected-terminal confirmation timer set at step S21, and the dialing information is sent from the leased telephone 10 via the leased-telephone extension 8, the leased-telephone interface circuit 7 and the data bus 28, then the program proceeds from step S22 to step S23. Here the ISDN trunk circuit 2 is instructed, via the data bus 27, to deliver a disconnect signal in response to the terminating request signal, after which the usual disconnect processing is executed. The reason for this is that if the aforementioned connected-terminal confirmation timer has not run out of time, the calling side is waiting for an answer from the called side.

When disconnect processing ends, the program proceeds to step S24, where the aforesaid transmission processing in accordance with the sent dialing information is carried out.

In accordance with the second embodiment described above, when an ISDN circuit is in an acquired state, a situation in which a transmission can no longer be made from the acquired line wire is eliminated, even if a terminating request signal is received from the acquired line wire.

An arrangement can be adopted in which terminating modes are registered in the system data in such a manner that the user is capable of selecting a terminating mode in which no response is made to a terminating request signal, as in the second embodiment, and a terminating mode for cancelling reservation of circuit acquisition, as in the first embodiment. Methods of registering the system data include registering, for each circuit in common, whether a response is to be made, or registering whether a response is to be made for each individual circuit.

Furthermore, in a case where there is no response to the terminating request signal, the user can be notified, by display means or the like, of the fact that the terminating request signal has been ignored, or of caller information contained by the terminating request signal. Alternatively, this can be stored in the RAM 6 or the like and subsequently printed out.

Thus, in accordance with the present embodiment as described above, even if a terminating request signal is received from an ISDN line wire whose acquisition has been reserved, a situation in which a transmission can no longer be made from the acquired line wire is prevented. Accordingly, the exchange system of the present invention features improved operability.

Third Embodiment

The foregoing description relates to a case where a terminating request is denied when the terminating request is received from an ISDN circuit whose acquisition has been reserved, or to a case where the reservation for acquisition is cancelled. However, the present invention is not limited to the foregoing examples, for an arrangement can be adopted in which control is performed so as to accept the terminating request by utilizing another idle channel. By performing control in such fashion, both transmission processing and terminating processing can be carried out.

Figure 5A:
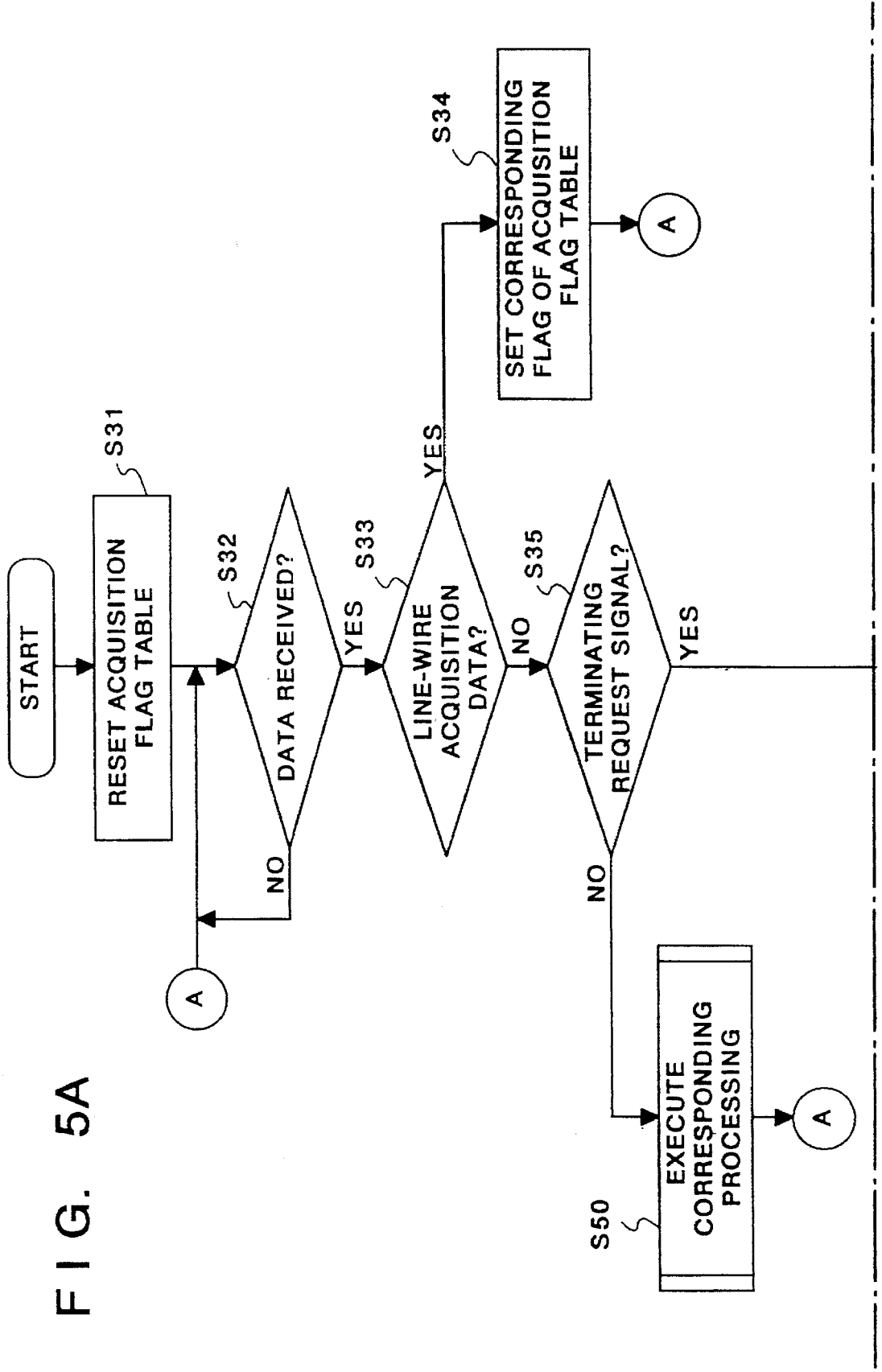

Reference will now be had to the flowchart of FIGS. 5A and 5B to describe the processing procedure of a third embodiment of the invention, in which a terminating request is accepted by utilizing another idle channel in a case where the terminating request is receiving from an ISDN circuit that has been acquired.

In the third embodiment also, the construction of the exchange system is the same as that shown in FIG. 1, and the external appearance of the leased telephone is the same as that depicted in FIG. 2.

First, at step S31, the CPU 4 initially sets (resets) the acquisition flags of all channels of the acquisition flag table stored in RAM 6. Monitoring is performed at step S32 to determine whether control data has been sent from the peripheral interface circuitry (the ISDN trunk circuit 2 or leased-telephone interface circuit 7) via the data buses 27, 28.

If, under these conditions, one line-wire key 31 on, say, the leased telephone 10 is pressed, a signal informing of the fact that the line-wire key 31 has been pressed is sent to the leased-telephone interface circuit 7 via the leased-telephone extension 8. Upon receiving this information indicative of line-wire key depression, the leased-telephone interface circuit 7 informs the CPU 4, via the data bus 28, of the fact that the line-wire key 31 of telephone 10 has been pressed. Upon being so notified, the control executed by the CPU 4 shifts from step S32 to step S33, where it is determined whether the received data is data requesting ISDN circuit acquisition owing to depression of the line-wire key 31. In this case, the data is the acquisition requesting data, and therefore the program proceeds from step S33 to step S34. Here the CPU 4 sets the acquisition flag of the corresponding channel in the acquisition flag table of RAM 6. This flag indicates that acquisition of the line wire has been reserved by the leased telephone 10. The program then returns to step S32, where the system waits for dialing information from the leased telephone 10.

If it is found at step S33 that the data is not data requesting line wire acquisition, the program proceeds to step S35. Here, if a terminating request signal (a set-up message) is sent from the ISDN circuit 1, the ISDN trunk circuit 2 detects this, analyzes the signal and informs the CPU 4, via the data bus 27, of the fact that control data indicative of the terminating request signal has been sent. Upon being informed of receipt of the terminating request signal from the ISDN trunk circuit 2, the CPU 4 causes processing to proceed to step S36. Here it is determined whether a designation to the effect that a change in terminating channel that is forbidden is being made, as in a case where the terminating request signal contains a designation of a terminating channel. If a terminating channel is being designated, the program proceeds to step S37, at which the acquisition flag of the corresponding channel in the acquisition flag table of RAM 6 is investigated. The purpose is to determine whether the channel designated by the terminating request in the terminating request signal is presently being reserved for acquisition. If the channel has been reserved, then the program proceeds to step S38, where control is performed so as not to accept the terminating request signal. The program then returns to step S32.

If it is found at step S37 that the channel designated by the terminating request in the terminating request signal is not being reserved for acquisition, the program proceeds to step S39, where a use flag of the corresponding channel is set in the acquisition flag table of RAM 6, with the channel designated by the terminating request signal serving as the channel to be used. The program then proceeds to step S40.

At step S40 the CPU 4 instructs the ISDN trunk circuit 2 to send an answer signal (call proc. or alert signal) in response to the terminating signal on the channel designated by the terminating request signal. The CPU 4 sets the pertinent acquisition flag. Well-known terminating processing is then performed.

In a case where a channel change is found to be forbidden at step S36, as when there is no designation of a terminating channel, the program proceeds to step S45. Here a search is performed among the channels belonging to the ISDN circuit which has received the terminating request signal in order to find a channel whose acquisition has not be reserved by the leased telephone or an idle channel, namely a channel not in use. To this end, it will suffice to search for an acquisition flag of the corresponding channel in the acquisition flag table of RAM 6. The program proceeds to step S40 following the setting of the use flag of the corresponding channel in the acquisition flag table of RAM 6, in which an idle channel serves as the channel to be used. Terminating processing is executed using the idle channel at step S40. If no idle channel is found at step S37, the program proceeds to step S38.

If a terminating request signal from the ISDN circuit is not received at step S35, the program proceeds to step S50, where processing corresponding to the sent data is executed, after which the program returns to step S32. By way of example, in a case where a dial signal from the connected leased telephone has been sent, a call request signal is assembled from the dial signal, the signal is sent to the ISDN 200, and processing is executed, such as for forming a communication channel with the other party's apparatus specified by the dial signal.

In accordance with this embodiment, as described above, a situation can be prevented in which, even if a terminating request signal is received from an ISDN line wire in an acquired state, a transmission can no longer be made from the acquired line wire. As a result, operation is easier.

In addition, in a case where a change in a designated channel by a terminating request signal is forbidden and the designated channel has been acquired, control is performed so as to cancel a reservation for acquisition of a channel whose acquisition has been reserved, and to answer the terminating request.

At this time, whether or not to answer can be set for every circuit. Alternatively, whether or not to answer can be set uniformly without regard to the circuit.

Furthermore, an arrangement can be adopted in which, if no answer has been made to a terminating request signal, the user is so informed, as by displaying this fact or information (the originating address, etc.) contained in the terminating request signal on the display unit 33 of the leased telephone. Alternatively, the foregoing can be stored in the RAM 6 in the form of a communication history. This will make it possible for the user to grasp the status of terminating request failure so that the proper action can be taken.

Fourth Embodiment

In the foregoing description, control is such that a terminating request is not accepted if the channel whose termination is requested by a terminating request signal has been acquired by the leased telephone. However, it is possible to adopt an arrangement in which the line-wire channel acquired by the leased telephone is changed automatically and an answer is made to the terminating request signal. In addition, operation is possible at the line-wire acquisition telephone. A fourth embodiment of the present invention in which such control is performed will now be described.

In the fourth embodiment also, the construction of the exchange system is the same as that shown in FIG. 1, and the external appearance of the leased telephone is the same as that depicted in FIG. 2.

The part of the processing procedure of the fourth embodiment that differs from the third embodiment will be described with reference to the flowchart of FIGS. 6A and 6B, in which processing steps identical with those in FIGS. 5A and 5B are designated by like step numbers and are not described again.

Figure 6A:
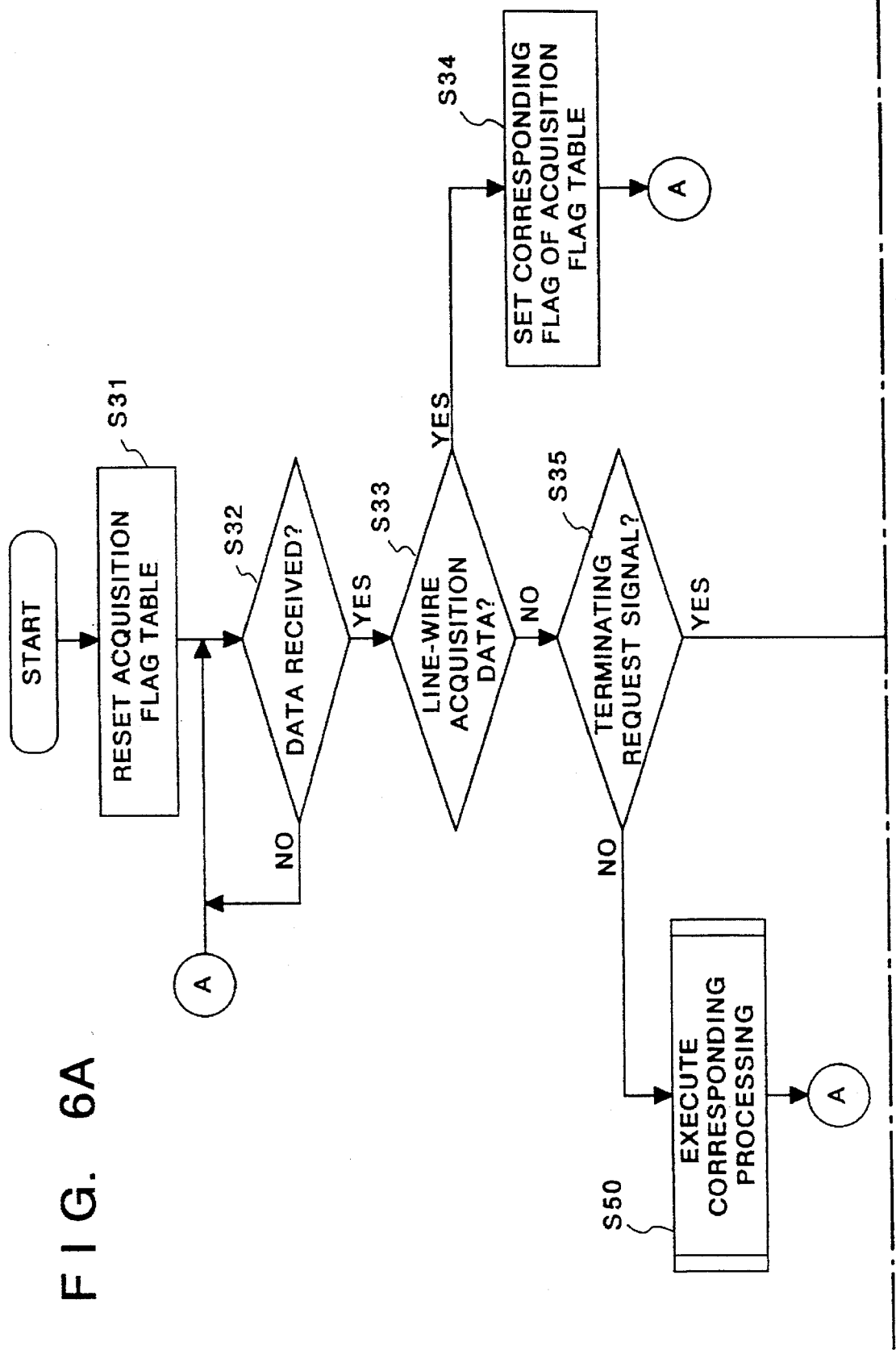
FIGS. 6A and 6B are flowcharts showing a control procedure according to the fourth embodiment of the invention.
Figure 6B:
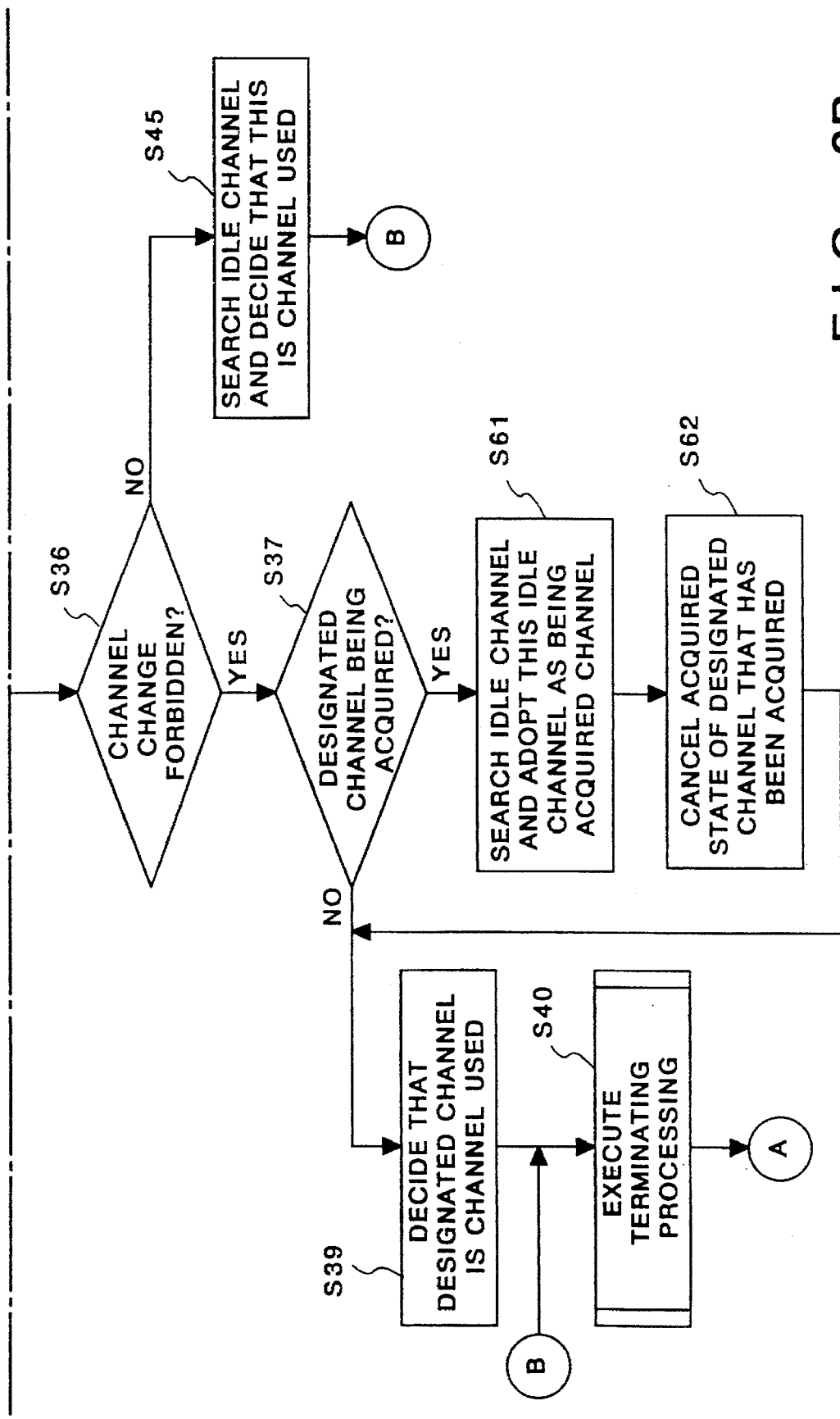

In FIGS. 6A and 6B, processing is the same as in FIGS. 5A and 5B except when the designated channel is found, at step S37, to have been acquired by the leased telephone.

In the fourth embodiment, the program proceeds to step S61 when the designated channel is found, at step S37, to have been acquired by the leased telephone. At step S61, a search is performed among the channels belonging to the ISDN circuit which has received the terminating request signal in order to find a channel whose acquisition has not be reserved by the leased telephone or an idle channel, namely a channel not in use. To this end, it will suffice to search for an acquisition flag of the corresponding channel in the acquisition flag table of RAM 6. The acquisition flag of the idle channel is set, and the acquired circuit of the corresponding leased telephone requesting acquisition is changed to the idle channel. This is followed by step S62, at which the acquisition flag of the channel designated by the terminating request signal and reserved until now is reset, thereby establishing the idle state, after which the program proceeds to step S39. It should be noted that when searching for another idle channel, the channel can be on another circuit, not a channel on the same circuit as that of the channel previously acquired. If there is no idle channel, the processing executed is similar to that of step S38 of the third embodiment shown in FIGS. 5A and 5B, and control is performed in such a manner that the terminating request is not accepted. The program then returns to step S32.

By performing the control described above, a line-wire channel acquired by a leased telephone is changed automatically and an answer can be made to a terminating request signal. In addition, operation is possible at the line-wire acquisition telephone.

In addition, the channel change or the like can be stored in the RAM 6 in the form of a communication history. This will make it possible for the user to grasp the status of terminating request failure so that the proper action can be taken.

Other Embodiments

In each of the types of control described above, control is performed in such a manner that the line-wire acquisition lamp 31a of the corresponding line-wire key 31 is lit if acquisition of the line wire is being reserved by a leased telephone, thereby allowing the operator to ascertain the acquisition state of the line wire.

Furthermore, by adopting such control, the display of the line-wire acquisition lamp 31a is changed to a line-wire key portion corresponding to a newly acquired line wire even when the acquired channel changes automatically, thereby making it possible to readily ascertain the change in the acquired line wire. In this case, a message to this effect may also be presented on the display unit 33.

Further, an arrangement can be adopted in which the line-wire acquisition lamp 31a is left lit at the previously acquired line wire, and the CPU 4 changes the correspondence in a correspondence table, which is stored in RAM 6 and gives the correspondence between the acquisition lamps and the acquired channels, thereby changing over the acquired channel. By adopting such an arrangement, it is made to appear to the user that there has been no changeover in the acquired channel. This makes it possible to simply operation greatly.

In accordance with the present embodiment, as described above, a situation can be prevented in which, even if a terminating request signal is received from an ISDN line wire in an acquired state, a transmission can no longer made from the acquired line wire. As a result, operation is easier.

It should be noted that the present invention is applicable even in cases where a terminating request signal does not contain a designation of a terminating channel.

More specifically, an arrangement can be adopted in which, in a case where the ISDN trunk circuit 2 in FIG. 1 has received a terminating request signal, which does not contain a terminating-channel designation, from the D channel of the basic circuit of the ISDN, the CPU 4 refers to the acquisition flag table in RAM 6, thereby determining whether the B1, B2 channels of the receiving circuit are being reserved for acquisition or are being used. If both of the B1, B2 channels are being reserved for acquisition or are being used, the CPU 4 does not answer the incoming call and either denies or ignores the incoming call. If either of the B1, B2 channels is idle, the CPU 4 instructs the ISDN trunk circuit 2 to return an answer signal and sets the line-wire acquisition flag of whichever channel has been selected.

By adopting such control, it is possible to obtain effects the same as those obtained when the terminating request signal contains a terminating-channel designation.

In the embodiments described above, a line-wire acquisition flag is set when the line-wire key 31 is pressed. However, it can be so arranged that the line-wire acquisition flag is set when one digit (or a predetermined digit) of dialing information is entered after the line-wire key 31 is pressed. In this case, the CPU 4 determines that the channel corresponding to the pressed line-wire key has been selected when the line-wire key 31 has been pressed and the one digit (or predetermined digit) of the dial information has been entered.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   acquiring means for acquiring a line for an outgoing call;
   detecting means for detecting an incoming call; and
   informing means for informing a user of the communication apparatus of a cancellation of the acquisition by said acquiring means in accordance with a detection by said detecting means while the line is acquired by said acquiring means.

2. The apparatus according to claim 1, wherein said informing means includes means for turning off an acquisition display in accordance with the detection by said detecting means.

3. The apparatus according to claim 1, wherein said detecting means detects the incoming call from an ISDN.

4. The apparatus according to claim 1, wherein said acquiring means acquires the line based on an operation of an external line key in an extension telephone.

5. A method of selecting channels for an outgoing call and an incoming call, comprising steps of:
   acquiring one of plural channels for the outgoing call;
   detecting the incoming call;
   selecting an idle channel for the outgoing call;
   cancelling an acquisition of the one of the plural channels; and
   responding to the incoming call by the one of the plural channels for the outgoing call which is acquired in said acquiring step and the acquisition of which is cancelled in said cancelling step.

6. The method according to claim 5, wherein in said detecting step, the incoming call from an ISDN is detected.

7. The method according to claim 5, wherein the one of the plural channels for the outgoing call is acquired based on an operation of an external line key in an extension telephone.

8. The method according to claim 5, wherein the acquisition of the one of the plural channels is cancelled in accordance with the detection in said detecting step.

9. A control method for a communication apparatus, comprising steps of:

acquiring a line for an outgoing call;

detecting an incoming call; and informing a user of the communication apparatus of a cancellation of the acquisition in said acquiring step, in accordance with a detection in said detection step while the line is acquired.

10. The method according to claim 9, wherein an acquisition display is turned off in said informing step, in accordance with the detection in said detecting step.

11. The method according to claim 9, wherein in said detecting step, the incoming call from an ISDN is detected.

12. The method according to claim 9, wherein the one of the plural channels for the outgoing call is acquired based on an operation of an external line key in an extension telephone.

13. A communication apparatus comprising:

acquiring means for acquiring one of plural channels for an outgoing call;

detecting means for detecting an incoming call; and control means for selecting an idle channel for the outgoing call, and for cancelling an acquisition of the one of the plural channels, wherein said control means responds to the incoming call by the one of the plural channels for the outgoing call which is acquired by said acquiring means and the acquisition of which is cancelled.

14. The apparatus according to claim 13, wherein said detecting means detects the incoming call from an ISDN.

15. The apparatus according to claim 13, wherein said acquiring means acquires the line based on an operation of an external line key in an extension telephone.

16. The apparatus according to claim 13, wherein said control means controls the acquisition of the one of the plural channels in accordance with a detection by said detecting means.

* * * * *

UNITED STATES PATENT AND TRADEMARK OFFICE
CERTIFICATE OF CORRECTION

PATENT NO. : 5,646,989
DATED : July 8, 1997
INVENTOR(S) : Tsuchida

It is certified that error appears in the above-indentified patent and that said Letters Patent is hereby corrected as shown below:

<u>COLUMN 1</u>:

Line 8, "an" should read --a--; and
Line 62, "an" should read --a--.

<u>COLUMN 6</u>:

Line 22, "operation," should read --operation.--.

<u>COLUMN 9</u>:

Line 62, "be" should read --been--.

<u>COLUMN 11</u>:

Line 5, "be" should read" --been--; and
Line 55, "simply" should read --simplify the--.

Signed and Sealed this

Tenth Day of March, 1998

Attest:

BRUCE LEHMAN

*Attesting Officer*   *Commissioner of Patents and Trademarks*